United States Patent
Chen

[19]

[11] Patent Number: 5,897,257
[45] Date of Patent: Apr. 27, 1999

[54] KEYBOARD WITH EXPANDABLE FUNCTION KEYS

[75] Inventor: Rich Chen, Taipei, Taiwan

[73] Assignee: Silitek Corporation, Taipei, Taiwan

[21] Appl. No.: 08/955,923

[22] Filed: Oct. 22, 1997

[51] Int. Cl.$^6$ ........................................................ B41J 5/08
[52] U.S. Cl. ............................ 400/473; 400/476; 400/479
[58] Field of Search ..................................... 400/472, 473, 400/476, 479, 485, 489, 490

[56] References Cited

U.S. PATENT DOCUMENTS

| | | | |
|---|---|---|---|
| 4,906,117 | 3/1990 | Birdwell | 400/190 |
| 4,964,075 | 10/1990 | Shaver et al. | 364/900 |
| 5,667,319 | 9/1997 | Satloff | 400/472 |

*Primary Examiner*—John Hilten
*Attorney, Agent, or Firm*—Rosenberg, Klein & Bilker

[57] ABSTRACT

The subject invention relates to a type of keyboard with expandable function keys, on the keyboard are a number of expanded function keys, said function keys are connected to the additional I/O cable for the microprocessor in the circuit structure in the keyboard, to coordinate with the original keyboard scanning matrix, forming a new scanning matrix, hence the default codes of said function keys may coordinate with the execution of the application programs in the window system, so the operator may directly control the existing functions of a peripheral device (multimedia) on the keyboard, with the control panel operation displayed on the monitor screen, with one IRQ connector pin of said microprocessor being connected jointly to the negative poles of three LED diodes, while the positive poles of each LED diode is connected to one line of the scanning matrix, so said keyboard may be compatible with an XT microprocessor in its application; so said function keys may be defined in the original scanning matrix that has not yet been defined, and the operator may directly control the existing functions of a peripheral device on the keyboard; and that said function keys may be set to "in-use" mode as required by the operator.

1 Claim, 6 Drawing Sheets

FIG. 4

|  | Y0 | Y1 | Y2 | Y3 | Y4 | Y5 | Y6 | Y7 | Y8 | Y9 | YA | YB | YC | YD | YE | YF | YG |
|---|---|---|---|---|---|---|---|---|---|---|---|---|---|---|---|---|---|
| X0 | ~` | F1 | F2 | 5% | 6^ | =+ | F8 | — | F9 | Insert | Delete | Ctrl Left | Shift Left | H19 | H9 | 14 Japan | Pause |
| X1 | 1! | 2@ | 3# | 4$ | 7& | 8* | 9( | 0) | F10 | F12 | F11 | Ctrl Right | Shift Right | H13 | Korea Right | 133 Japan | 94 |
| X2 | Q | W | E | R | U | I | O | P | 9 PgUp | 8 ← | 7 Hom | H10 | H14 | ALT Left | 56 Japan | H7 | 107 |
| X3 | Tab | F3 | T | Y | [{ | F7 | {[ | 3 PgDn | 6 ↑ | 5 | 4 ↓ | H4 | H15 | ALT Right | H5 | 109 | 42 |
| X4 | A | S | D | F | J | K | L | :; | Enter (Pad) | 2 ↓ | 1 End | H16 | H12 | 131 Japan | Win Right | H8 | Caps Lock |
| X5 | Esc | >< | F4 | G | H | F6 | _ | "' | Page Up | 0 Ins | Print Screen | H20 | H2 | 132 Japan | H6 | Win Lift | ← |
| X6 | Z | X | C | V | M | <, | >. | Home | Enter | / | — | H11 | H3 | End | Del | + | Korea Left |
| X7 | F5 | Space Bar | B | N | Back Space | ?/ | * | ↓ | Page Down | ↑ | ↓ | H1 | H18 | App win95 | H17 | Scroll Lock | Num Lock |

| Model | H1 | H2 | H3 | H4 | H5 | H6 | H7 | H8 | H9 | H10 |
|---|---|---|---|---|---|---|---|---|---|---|
| | Play/Pause | Stop | Calculator | Transfer | Volume Up | Volume Dn | Mute | Menu/Help | Suspend | Record |
| Model | H11 | H12 | H13 | H14 | H15 | H16 | H17 | H18 | H19 | H20 |
| | Rewind | WWW | Close | Next Track | Prev Track | Rotate Window | Eject | None | Coffee Break | Mouse Key |

FIG. 5

|  | YES | NO |
|---|---|---|
| D0 | XT | AT, PS/2 |
| D1 | Interior function key | Exterior function key |
| D2 | (Disable) Invalid function key | (Enable) Invalid function key |

FIG. 6

KEYBOARD WITH EXPANDABLE FUNCTION KEYS

BACKGROUND OF THE INVENTION

The subject invention relates to a type of keyboard with expandable function keys, to an IRQ pin of the microprocessor is connected to three LED diodes, while the positive pole of respective LED diode is connected to a line of scanning matrix, so said keyboard is compatible with an XT microprocessor; and said function keys may be defined in the original scanning matrix that has not yet been defined, so the operator may directly control the existing functions of a peripheral device on the keyboard; and that said function keys may be set to "in-use" mode as required by the operator.

Conventionally, a prior art of "keyboard with expandable function keys" comprises a number of expanded function keys on the keyboard, such as multimedia control keys (Volume Up, Volume Dn, Mute, WWW, Record, Rewind, Close, . . . ), said function keys are connected to the additional I/O cable for the microprocessor in the circuit structure, to coordinate with the original keyboard scanning matrix, forming a new scanning matrix, and achieve the objective of expanded function keys, so that the operator may directly control the existing functions of a peripheral device on the keyboard, with operation displayed on a monitor screen, or the expanded function keys are made to coordinate with a macro program, to accomplish the scheduled control; however, it is designed to function with an AT, PS/2 microprocessor, hence it is not compatible with an XT microprocessor.

SUMMARY OF THE INVENTION

The primary objective of the subject invention is to present a further improvement on a prior art of "keyboard with expandable function keys", so said keyboard may be compatible with an XT microprocessor, and the function keys may be set to "in-use" mode whenever required by the user.

To enable full understanding, the technical approaches and performance to accomplish the above objective and configuration of the subject invention are described in details with drawings of embodiment:

BRIEF DESCRIPTION OF DRAWINGS

FIG. 4 is a conversion chart of the subject invention of keyboard scanning matrix and default codes.

FIG. 5 is a chart of programmed function keys in the subject invention.

FIG. 6 is a chart of the functional description of diodes.

BRIEF DESCRIPTION OF NUMERALS 1 keyboard
11 microprocessor
111 I/O cable
2 function key
21 CD Player
22 Play
23 ←
24 →
25 Volume
D0 LED diode
D1 LED diode
D2 LED diode

DETAILED DESCRIPTION OF PREFERRED EMBODIMENT

Figure 1:
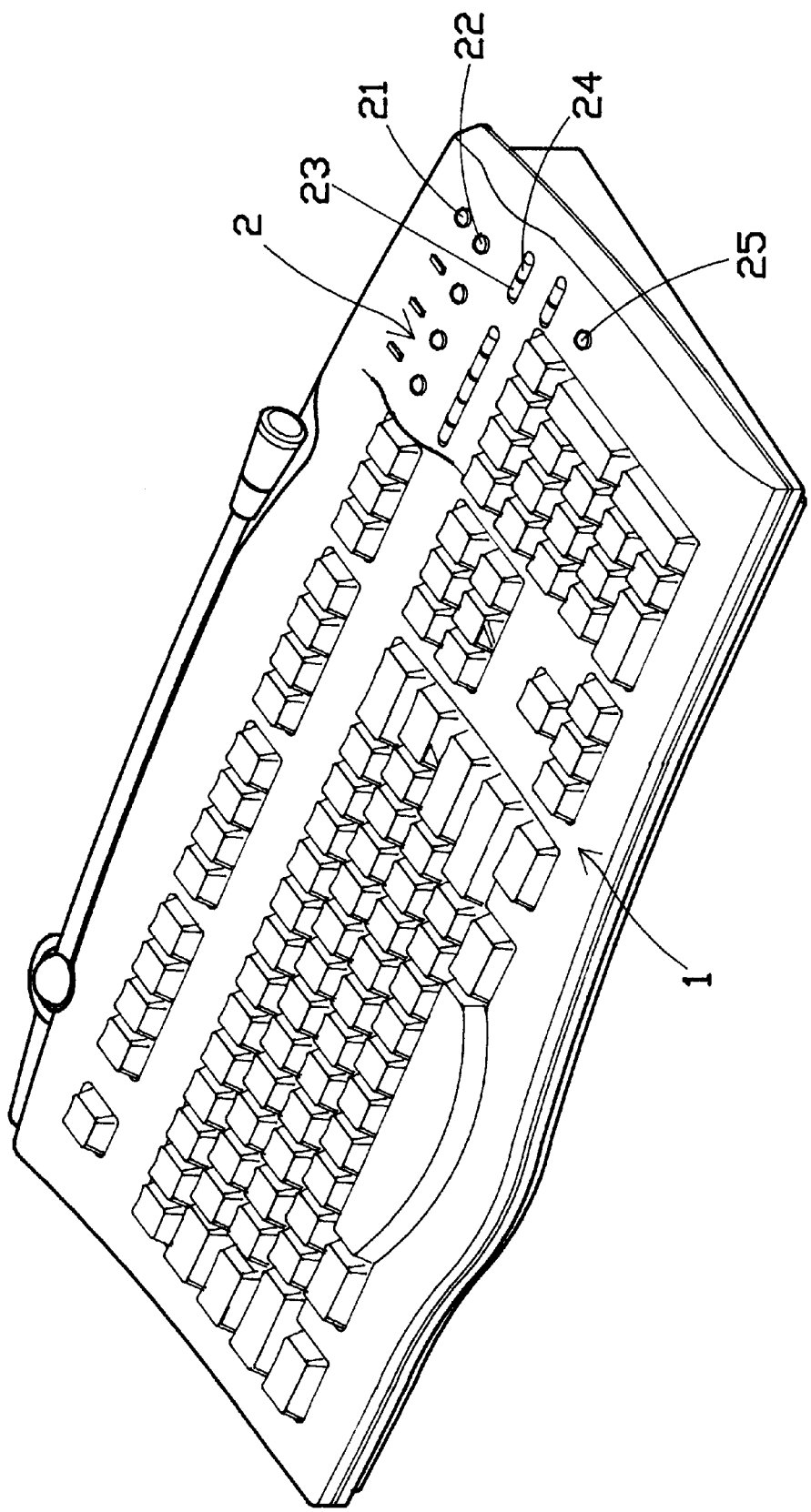
FIG. 1 is a perspective view of a prior art of keyboard
Figure 2:
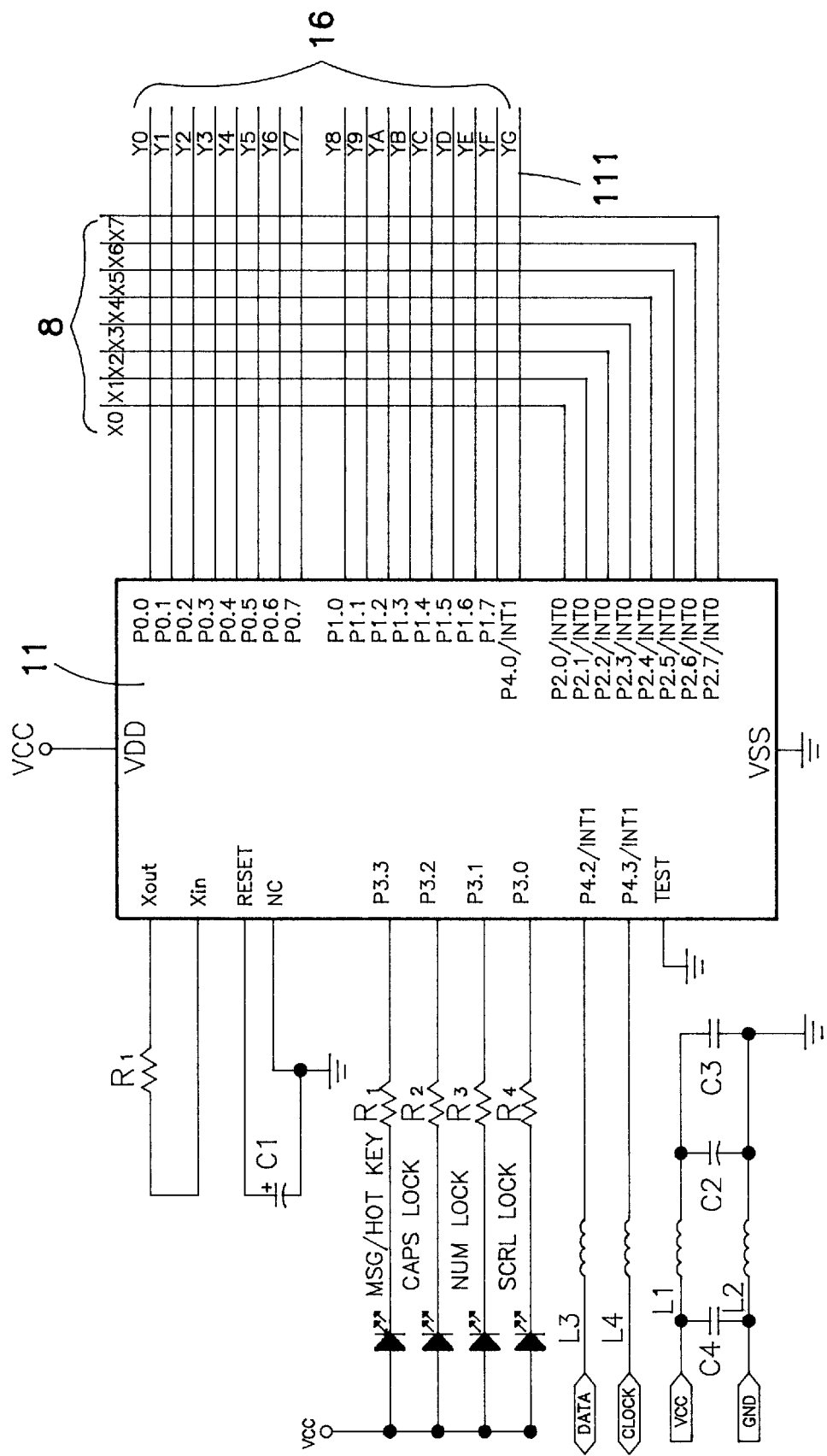
FIG. 2 is a wiring diagram of a prior art of keyboard scanning matrix.
Figure 3:
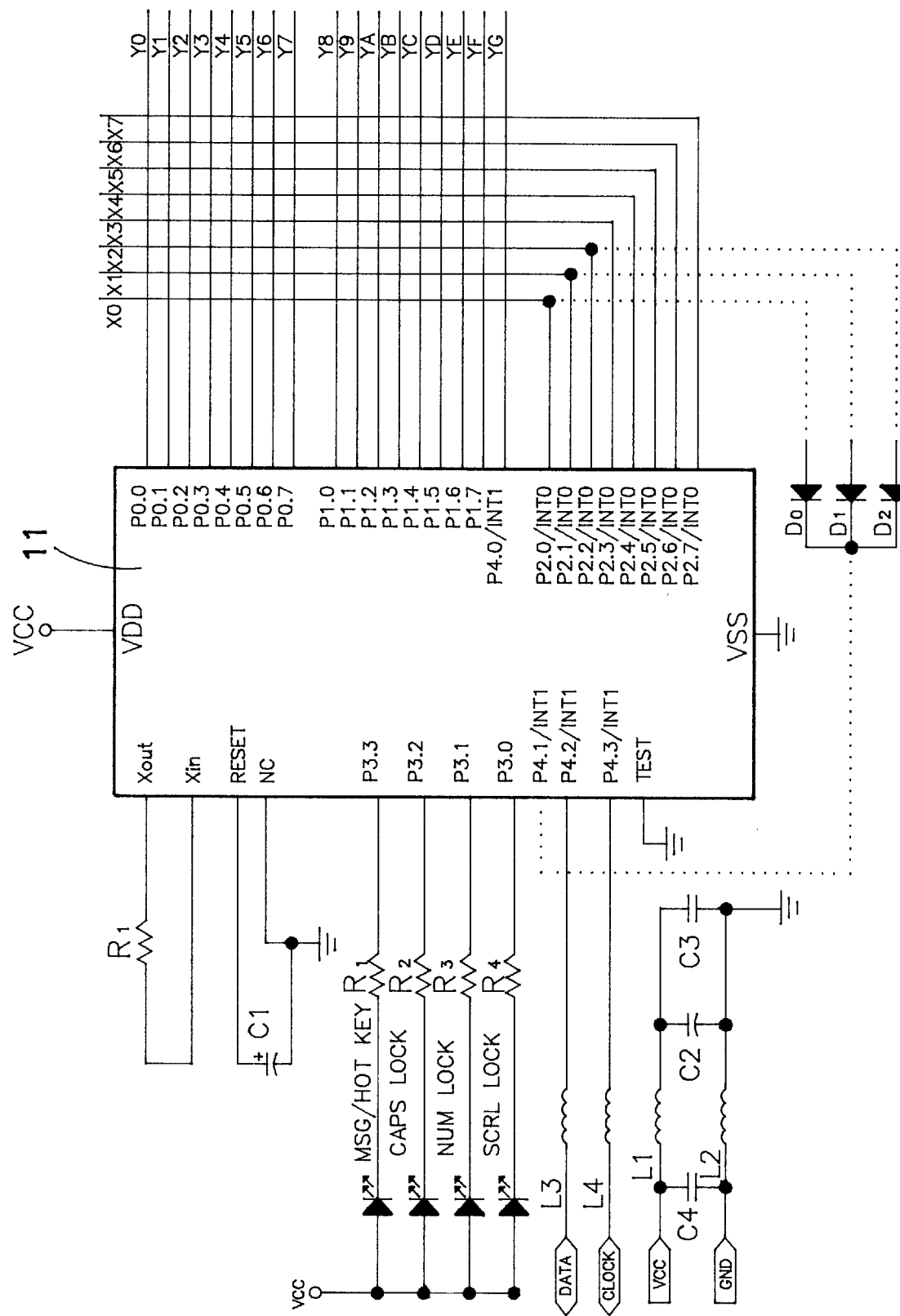
FIG. 3 is a wiring diagram of the subject invention of keyboard scanning matrix.

Please refer to FIGS. 1 to 6, the subject invention relates to a type of keyboard with expandable function keys, comprising a keyboard 1, a number of expandable function keys 2 and three diodes D0–D2; wherein:

On the right side of the keyboard 1 are a number of expandable function keys 2, including "CD Player" 21, "Play" 22, "←" 23, "→" 24, "Volume" 25, etc., said function keys 2 are connected to the additional I/O cable 111 for the microprocessor 11 in the interior circuit structure inside the keyboard 1, to coordinate with an existing keyboard scanning matrix (8×16), forming a new scanning matrix, to achieve the objective of expanded function keys (the number of said expandable function keys may be designed to suit the user's requirements), so the default codes of said expandable function keys will coordinate with the execution of application programs in the window system, so the operator may control the functions of a multimedia peripheral device (for instance, a CD Player is cited in the subject example of embodiment) directly on the keyboard 1, which will be shown on a monitor screen, a conversion chart of said function keys and scanning matrix is shown in FIG. 4, wherein H1–H20 are the expansion keys of the subject design, the chart of keyboard for H1–H20 is shown in FIG. 5.

When an operator depresses the "CD Player" function key 21 on the keyboard, the application program in the window system will scan and hook the default code of the "CD Player" key on the keyboard that is depressed by the operator, and determine whether said default code is a function key or not;

If the default code has been determined to know that the function key 21 of "CD Player" is indeed a function key depressed by the operator, the application program in the window system will substitute the Win Exec formula provided by the Windows AP in the path where "CD Player" is located and the file parameter in the application program CD PLAYER.EXE (Bundle With Windows 95), thus, said "CD Player" is activated, and the control panel will immediately be displayed on the monitor screen;

Then, if the operator depresses the "Play" function key 22 for the "CD Player", the application program in the window system will convert this "Play" function key to a Keyboard Stroke of "Ctrl+P", and this signal will be sent back to the window system, and the "Play" operation will be executed upon its reception by the CD Player.

Please refer to FIGS. 3 to 6, one IRQ connector pin of the microprocessor 11 in the subject invention may be connected to the negative poles of three LED diodes D0, D1 and D2, while the positive pole of each of the LED diodes D0, D1 and D2 is respectively connected to a line of the scanning matrix, so said keyboard is compatible with XT microprocessor in its application; and so the operator may define the function keys in the original scanning matrix that has not yet been defined, and that the operator may directly control the functions of a peripheral device directly on the keyboard; and the function keys may be set to "in-use" mode whenever required by the user.

Summing up, the subject invention of "a keyboard with expandable function keys", with such features to enable said keyboard's compatibility to an XT microprocessor, and design of the function keys to suit user's requirements, is an unprecedented new version that will fully satisfy the qualifications of a patent right, hence this application is filed in accordance with the Patent Law to protect the subject inventor's rights and interests. Your favorable consideration shall be appreciated. Should you have any doubt or questions, please feel free to keep me advised.

It is declared hereby that the above description, covering only the preferred embodiment of the subject invention, should not be based to limit or restrict the subject claim, and that all equivalent structural and/or configurational variations and/or modifications easily conceivable to anyone skilled in the subject art, and deriving from the subject description with drawings herein shall reasonably be included in the intent of the subject claim.

I claim:

1. A keyboard having an expandable number of function keys and being compatible with an XT type host computer, comprising:

a housing having a plurality of character key switches, a plurality of function key switches and a plurality of expanded function key switches;

a microprocessor disposed in said housing and coupled to said plurality of character key switches, said plurality of function key switches and said plurality of expanded function key switches by a scanned matrix of row and column lines, said microprocessor detecting operation of said plurality of character key switches and said plurality of function key switches and establishing coded signals from a predefined portion of a conversion matrix corresponding to a respective first portion of said scanned matrix for transmission to a host computer, said microprocessor detecting operation of said plurality of expanded function key switches and establishing coded signals representing control functions for a peripheral device of the host computer from a previously undefined portion of said conversion matrix corresponding to a respective second portion of said scanned matrix representing said plurality of expanded function key switches; and, a plurality of light emitting diodes respectively coupled to said microprocessor, each of said plurality of light emitting diodes having an anode coupled to a respective one of said scanned lines of said matrix, said plurality of light emitting diodes each having a cathode coupled to an interrupt request terminal of said microprocessor for indicating status of selected ones of said plurality of expanded function key switches while maintaining compatibility with an XT type host computer.

* * * * *